US008386204B2

(12) United States Patent
Cianflone et al.

(10) Patent No.: US 8,386,204 B2
(45) Date of Patent: Feb. 26, 2013

(54) METHOD FOR THE DIAGNOSIS OF THE EGR COOLER EFFICIENCY IN A DIESEL ENGINE

(75) Inventors: Francesco Cianflone, Turin (IT); Morena Bruno, Turin (IT); Nando Vennettilli, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 125 days.

(21) Appl. No.: 12/877,924

(22) Filed: Sep. 8, 2010
(Under 37 CFR 1.47)

(65) Prior Publication Data

US 2011/0224948 A1 Sep. 15, 2011

(30) Foreign Application Priority Data

Sep. 9, 2009 (GB) .................................. 0915743.9

(51) Int. Cl.
*G01K 15/00* (2006.01)
*G01K 19/00* (2006.01)

(52) U.S. Cl. ......... 702/99; 702/113; 703/2; 123/568.12; 123/568.16

(58) Field of Classification Search .................... 702/99, 702/113, 182, 183, 189; 700/29; 703/2; 60/605.2; 123/568.12, 158.16, 56.168; 73/118.1, 73/117.3
See application file for complete search history.

(56) References Cited

U.S. PATENT DOCUMENTS

| | | | | |
|---|---|---|---|---|
| 6,993,909 | B2 * | 2/2006 | Matsunaga et al. | 60/605.2 |
| 2010/0292811 | A1 * | 11/2010 | Schwarte | 700/29 |

FOREIGN PATENT DOCUMENTS

| | | | |
|---|---|---|---|
| EP | 1416139 | A2 | 5/2004 |
| JP | 2009114871 | A | 5/2009 |
| KR | 20090030847 | A | 3/2009 |

OTHER PUBLICATIONS

Search Report for Great Britain Application No. 0915743.9 dated Dec. 23, 2009.

* cited by examiner

*Primary Examiner* — Sujoy Kundu
(74) *Attorney, Agent, or Firm* — Ingrassia Fisher & Lorenz, P.C.

(57) ABSTRACT

A method is provided for the diagnosis of the EGR cooler efficiency in a Diesel engine that includes but is not limited to construction of a model for determining the temperature drop $y=\Delta T$ in the EGR cooler, the model having a parameter vector $\theta$ and an input vector x; performing a model calibration phase in order to estimate the bias $h_0$ of the system; calculation of a set of primary residuals $\epsilon(\theta_0, x, \Delta T)$, staffing from the model equation and using the results of the calibration phase; calculation of a set of improved residuals $\epsilon_N(\theta_0)$:

$$\varepsilon_N(\theta_0) = \frac{1}{\sqrt{N}} \sum_{k=1}^{N} (\varepsilon(\theta_0, x_k, y_k) - h_0)$$

where N is the number of samples on which the diagnostic test is performed; calculation of a diagnostic index S:

$$S=\epsilon^T{}_N R_0^{-1} \epsilon_N$$

and, use of the diagnostic index S in order to diagnose the efficiency of the EGR cooler.

6 Claims, 2 Drawing Sheets

METHOD FOR THE DIAGNOSIS OF THE EGR COOLER EFFICIENCY IN A DIESEL ENGINE

CROSS-REFERENCE TO RELATED APPLICATION

This application claims priority to British Patent Application No. 0915743.9, filed Sep. 9, 2009, which is incorporated herein by reference in its entirety.

TECHNICAL FIELD

The present invention relates to a method for the diagnosis of the EGR cooler efficiency in a Diesel engine.

BACKGROUND

A diesel engine system generally comprises an exhaust gas recirculation (EGR) system that works by recirculating a portion of an engine's exhaust gas back to the engine cylinders. In modern diesel engines, the EGR gas is cooled through a heat exchanger to allow the introduction into the engine of a greater mass of recirculated gas and to lower gas temperature. The EGR system is primarily used in order to reduce emissions, especially of NOx.

Current European and US legislation require that the Engine Control Unit (ECU) on board has also a monitoring function of the EGR cooler efficiency. Specifically, EGR cooler efficiency is measured by means of two temperature sensors, one at the EGR cooler inlet in order to measure the inlet temperature $T_{inlet}$ and the other at the outlet of the EGR cooler in order to measure the outlet temperature $T_{outlet}$. With this two sensors approach, the EGR cooler efficiency $\eta=(T_{inlet}-T_{outlet})/(T_{inlet}-T_{outlet})$ value can be measured and, when it is inferior to a predetermined threshold, an alarm or any other indication may be given in order to signal that the performance of the EGR cooler is degraded. The drawback of this prior art approach is that two temperature sensors are needed for the EGR cooler efficiency degradation detection and these sensors have generally a high cost.

At least one aim of the embodiments of the invention is to provide a methodology that allows Diesel controller to have a monitoring function for the EGR cooler efficiency and to comply with legislation, while at the same time being able to reduce overall costs. A further aim of the invention is to avoid usage of temperature sensors across the EGR cooler, in order to realize a substantial cost saving. In addition, other desirable features and characteristics will become apparent from the subsequent summary or detailed description, and the appended claims, taken in conjunction with the accompanying drawings and this background.

SUMMARY

The embodiments of invention apply the basic ideas of the Statistical Local Approach (SLA) theory. Such theory is disclosed, for example, in Zhang Q., Basseville M, Automatica, 1994 vol. 30 no. 1. A further application of the SLA approach can be found in Amr Radwan, Ahmed Soliman and Giorgio Rizzoni, SAE technical paper n. 2003-01-1057.

In order to apply the SLA methodology to the mentioned technical problem, a steady state analytical model of the EGR cooler has been developed. The model developed does not use temperature sensors across the cooler and it is able to correlate the efficiency of the cooler with the gas temperature and pressure values in the exhaust and intake manifold.

Specifically, the embodiments of the invention provides for a method for the diagnosis of the EGR cooler efficiency in a Diesel engine, characterized in that of comprising at least the following steps: construction of a model for determining the temperature drop $y=\Delta T$ in the EGR cooler, the model having a parameter vector $\theta$ and an input vector performing a model calibration phase in order to estimate the bias $h_0$ of the system; calculation of a set of primary residuals $\epsilon(\theta_0, x, \Delta T)$, starting from the model equation and using the results of the calibration phase; calculation of a set of improved residuals $\epsilon_N(\theta_0)$:

$$\varepsilon_N(\theta_0) = \frac{1}{\sqrt{N}} \sum_{k=1}^{N} (\varepsilon(\theta_0, x_k, y_k) - h_0)$$

where N is the number of samples on which the diagnostic test is performed; calculation of a diagnostic index S:

$$S=\epsilon^T_N R_0^{-1} \epsilon_N$$

where $R_0$ is the correlation matrix calculated from the healthy system;

use of the diagnostic index S in order to diagnose the efficiency of the EGR cooler.

The foregoing allows the definition of a reliable and robust diagnostic index. Moreover, applying the SLA theory is possible to define a diagnostic index S that has specific statistical properties (for example it follows the chi-square distribution). Using the well known statistical properties of the chi-square distribution it is then possible to define a diagnostic threshold on the mentioned index that univocally set the probability to find an EGR cooler fault.

In other words, after having set a certain probability of false alarm (for example 1%) the diagnostic threshold can be univocally determined. For example, iii during the monitoring of the system, the diagnostic index has a value above the threshold, then the current observed system does not correspond to the nominal one with a probability of 99%. A faulty system can therefore be diagnosed by ECU with high probability and without use of temperature sensors, but only on the base of the statistical model above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses. Furthermore, there is no intention to be bound by any theory presented in the preceding background or summary or the following detailed description.

A preferred embodiment of the present invention is described with reference to the accompanying drawings. The first step comprises the creation of a model for determining the temperature drop in the EGR cooler. The employed exemplary model is based on:

$$T_{in}-T_{out}=k_1\cdot T_{H_2O}\cdot(P_{exhaust}-P_{intake})^{k2}\cdot T_{exhaust}{}^{k3}\cdot N_{emg}{}^{k4} \qquad (1)$$

where:

$T_{in}$=temperature at the inlet of the EGR cooler,
$T_{out}$=temperature at the outlet of the EGR cooler,
$T_{H2O}$=coolant temperature,
$P_{exhaust}$=pressure at the outlet of the E60 GR cooler,
$P_{intake}$=pressure at the inlet of the EGR cooler,
$T_{exhaust}$=temperature at the exhaust of the EGR cooler,
$N_{eng}$=engine speed.

Furthermore, the parameters $k_1$, $k_2$, $k_3$ and $k_4$ have been identified and validated from a set of 144 steady state test bench measurements (50% identification, 50% validation).

Figure 1:
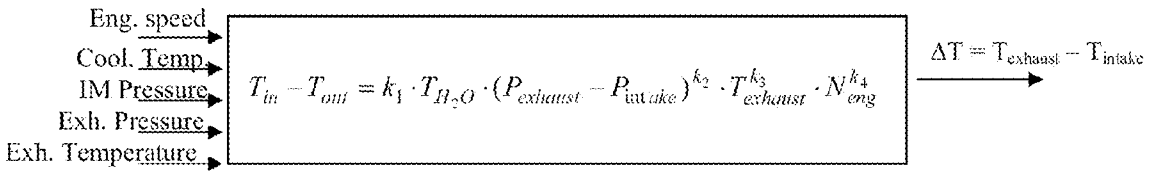
FIG. 1 represents schematically a mathematical model used for the diagnosis of the EGR cooler of an embodiment of the invention.
Figure 2:
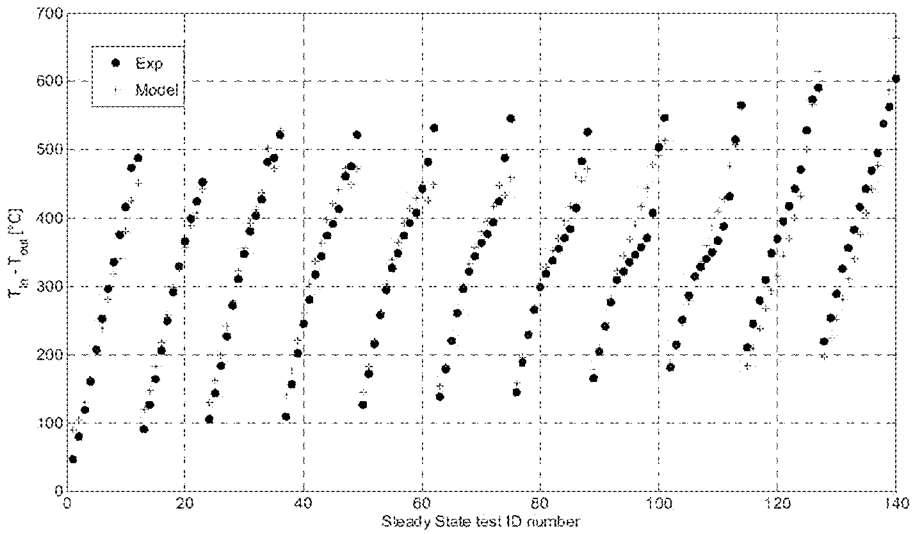
FIG. 2 represents graphically the correspondence of such model versus a set of steady state test bench measurements.
Figure 3:
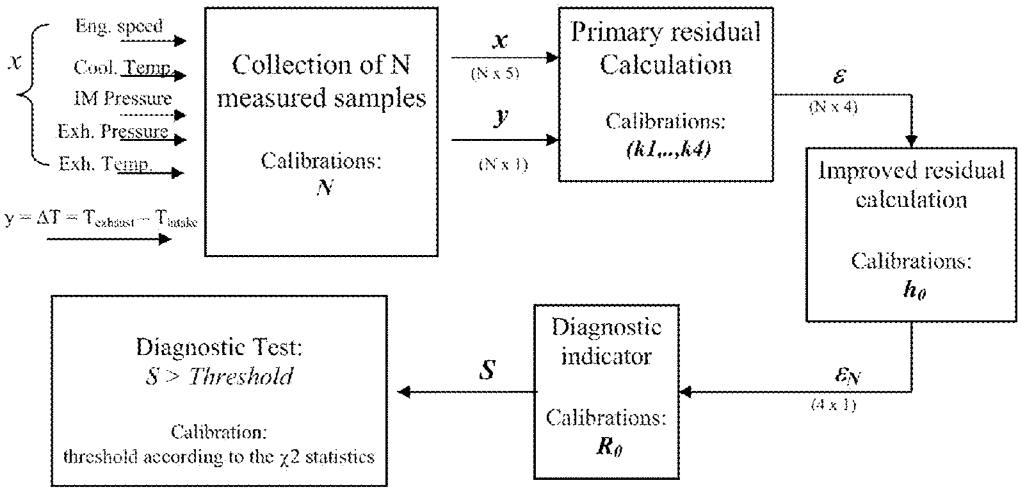
FIG. 3 represents a simplified block diagram for the calculation of a diagnostic index according to an embodiment of the invention.

The outcome of these operations is schematically represented in FIG. 2, whereby a close correspondence of the values calculated by the above model is plotted versus a set of steady state test bench measurements.

The method employs features from the Statistical Local Approach (SLA) theory and, in particular, it is based on the calculation of "improved" residuals that are used to detect changes in the system parameters of a general analytical non-linear model As usual, with the term residual it is intended the difference between the model value and the actual measured value.

Defining the parameter vector of the above model as $\theta=(k1, \ldots, k4)$, the inputs of the model as $x=(N_{eng}, T_{H2O}, P_{int}, P_{exh}, T_{exh})$ and the temperature drop as $y=\Delta T$, then the standard residuals are defined as $$e(x,\theta)=y-\hat{y}(x,\theta)$$

The object is to detect changes in the parameter vector $\theta$ respect to a nominal vector $\theta_0$ evaluating an improved residual vector defined stirring from the estimation error. Changes in the parameter vector $\theta$ respect to a nominal vector $\theta_0$ may for example occur due to the wear of the engine components, aging or other time-dependent factors.

The nominal vector $\theta_0$ is usually determined using model identification techniques that minimize the mean square error:

$$a(\theta)=E[e^T(x,\theta)\cdot e(x,\theta)]$$

One of the key points of the SLA approach is that, if the mean square error $a(\theta)$ is minimum in case of nominal system, then the derivative of a with respect to the parameter vector should be close to zap.

According to the above observation, the SLA defines a primary residual as follows:

$$\varepsilon(\theta_0, x, y) = -\frac{1}{2}\frac{\partial}{\partial\theta}(e^T(x,\theta)\cdot e(x,\theta))$$

Given x and y, $\epsilon$ is a vector of dimension equal to the dimension of the $\theta$ vector.

Having developed the model equations of the system, then the primary residuals can be calculated analytically:

$$\varepsilon(\theta_0, x, y) = -\frac{1}{2}\frac{\partial}{\partial\theta}(e^T(x,\theta)\cdot e(x,\theta)) = \left(\frac{\partial\hat{y}(x,\theta)}{\partial\theta}\bigg|_{\theta=\theta_0}\right)(y-\hat{y}(x,\theta_0))$$

It is possible to take into account an eventual bias of the system due to modeling errors or to imprecise estimation of the nominal parameters. The bias is estimated measuring K samples of the healthy system:

$$h_0 = E[\varepsilon(\theta_0, x, y^0)] = \frac{1}{K}\sum_{k=1}^{K}(\varepsilon(\theta_0, x_k, y_k^0))$$

where $h_0$ is a vector of dimension equal to the dimension of the $\theta$ vector.

Considering a set of N samples it is then possible to define bias-less normalized "improved residuals" as follows:

$$\varepsilon_N(\theta_0) = \frac{1}{\sqrt{N}}\sum_{k=1}^{N}(\varepsilon(\theta_0, x_k, y_k) - h_0)$$

Thanks to the central limit theorem, the improved residuals are Gaussian distributed with a zero mean if the system is healthy or with a non-zero mean in case of a faulty system.

The problem of fault detection can be then reduced to the problem of detecting changes in the mean value of the improved residuals.

Because of the bias calculation and the definition of the improved residuals the method should be robust against model errors and poor nominal parameter estimation. The standard statistical $\chi^2$ (chi-square) test can be applied for the mean value change detection, namely a diagnostic threshold can be defined by the general characteristics of the $\chi^2$ statistics.

For the implementation of the diagnostic test of the EGR cooler the following quantity has been used as deviation indicator:

$$S=\epsilon^T_N R_0^{-1}\epsilon_N$$

where $R_0$ is the correlation matrix calculated for the healthy system and it is chi-square distributed if the improved residuals are Gaussian.

According to the theoretical background above explained, the method of the invention is now described with its specific application to the EGR cooler diagnostic function. After the creation of the model for determining the temperature drop in the EGR cooler described in equation (1) above, a series of calibration steps for EGR cooler diagnosis are performed. These operations involve first to find the optimal values of the model parameter $\theta=(k1, \ldots, k4)$, using standard identification techniques on a representative N samples with N large enough of experimental data set taken on an healthy EGR cooler system. Furthermore it is implemented the calculation of the bias in the following way:

i. (4×1) dimension

Then calculation of the following matric E on the healthy experimental data is then performed:

$$E_{ij}=\epsilon_j(\theta_0,x_i,y_i^0)—h_{0i}$$

(N×4) dimension

Finally the covariance matrix $R_0$ of the healthy improved residual matrix is calculated:

$$R_0=\text{cov}(E)$$

(4×4) dimension

The model parameters $\theta_0$, the bias $h_0$ and the covariance matrix $R_0$ are calculated only during the calibration phase.

Therefore they are strictly related to the healthy EGR cooler system. After the calibration phase the main implementation of the method follows.

Starting from the model equation, a direct calculation of the primary residuals $\epsilon(\theta_0, x, \Delta T)$ is implemented, where:

$\theta_0=(k1, \ldots, k4)$ are the calibration parameters of the model $x=(N_{eng}, T_{H2O}, P_{int}, P_{exh}, T_{exh})$ are the (measured or modeled) inputs of the system model $\Delta T$ is the measured temperature difference $T_{exhaust}-T_{intake}$ Next it is implemented the calculation of the improved residuals $\epsilon_N(k1, \ldots, k4)$:

$$\varepsilon_N(\theta_0) = \frac{1}{\sqrt{N}} \sum_{k=1}^{N} (\varepsilon(\theta_0, x_k, y_k) - h_0)$$

where N is the number of samples on which the diagnostic test is performed.

Finally the method provides for the calculation of a diagnostic index S:

$$S=\epsilon^T_N R_0^{-1} \epsilon_N$$

The diagnostic index S is then used to define a diagnostic threshold index that univocally set the probability to find an EGR cooler fault following the $\chi^2$ (chi-square) statistical test.

An application of the method will be now described with reference to a specific concrete example. In the concrete example a fault in the EGR cooler efficiency has been simulated, blocking the bypass actuator in an intermediate position and measuring the system in 24 different engine steady state working points. Two sets of measurements have thus been acquired blocking the actuator in two different positions (30% and 75% of the complete open position).

A Montecarlo simulation has been performed whereby a system diagnostic index S according to the method has been calculated. The system diagnostic index S follows the $\chi^2$ (chi-square) test for the different columns of the Table 1 below. The values for each column have been obtained calculating the mean value of S on 20 groups of data measurement chosen at random from the complete set of data.

TABLE 1

| | Number of steady state measurement used for the calculation | | | | |
|---|---|---|---|---|---|
| | 5 | 10 | 15 | 20 | 24 |
| S (healty) | 4.0 | 5.0 | 4.9 | 5.1 | 5.0 |
| S (30% fault) | 389.8 | 703.1 | 1000.2 | 1369.1 | 1523.3 |
| S (75% fault) | 554.6 | 1004.0 | 1427.8 | 1882.7 | 2024.1 |
| (S75-Shealthy)/ (S30-Shealthy) | 1.4 | 1.4 | 1.4 | 1.4 | 1.3 |
| CumSum (healthy) | 24 | 56 | 91 | 116 | 137 |
| CumSum (30% fault) | 443.6 | 902.6 | 1352.8 | 1813.0 | 2147.0 |
| CumSum (75% fault) | 509.1 | 1031.5 | 1547.3 | 2077.0 | 2462.0 |
| (Cum75-CumHealthy)/ (Cum30-CumHealthy) | 1.2 | 1.2 | 1.2 | 1.2 | 1.2 |

A clear difference between nominal and faulty cases is shown by the S parameter. Setting the probability of false alarm to 1% then according to the $\chi^2$ statistics the healthy hypothesis is true if S<11,35. The comparison with the cumulative residual sum shows a better fault sensitivity of the SLA calculation. The cumulative sum calculation is biased by the modeling error.

The method of the embodiments of the invention has a number of important advantages over the prior art. First it allows compliance with the existing legislation, especially OBD legislation compliance. As a second added benefit, the invention allow for improved quality of the monitoring system. Furthermore the embodiments of the invention avoid usage of temperature sensors across the cooler, realizing substantial cost savings. The method of the embodiments of invention is therefore able to correlate the efficiency of the cooler with the gas temperature and pressure values in the exhaust and intake manifold. Finally, the calibration methodology employed is based on well established theoretical concepts and therefore the accuracy and reliability of the method employed is ensured.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims. The foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for a diagnosis of an efficiency of an exhaust gas recirculation (EGR) cooler in a diesel engine, comprising the steps of:

constructing, with an engine control unit (ECU), a model for determining the temperature drop $y=\Delta T$ in the EGR cooler, the model having a parameter vector $\theta$ and an input vector x;

performing, with the ECU, a model calibration phase in order to estimate the bias $h_0$ of the system;

calculating, with the ECU, a set of primary residuals $\epsilon(\theta_0, x, \Delta T)$, starting from a model equation and using the results of a calibration phase;

calculating, with the ECU, a set of improved residuals $\epsilon_N(\theta_0)$:

$$\varepsilon_N(\theta_0) = \frac{1}{\sqrt{N}} \sum_{k=1}^{N} (\varepsilon(\theta_0, x_k, y_k) - h_0)$$

where N is the number of samples on which a diagnostic test is performed;

calculating, with the ECU, a diagnostic index S:

$$S=\epsilon_N^T R_0^{-1} \epsilon_N$$

where $R_0$ is a correlation matrix calculated from a healthy system; and utilizing the diagnostic index S in order to diagnose the efficiency of the EGR cooler.

2. The method for the diagnosis of the efficiency of the EGR cooler in the diesel engine, of claim 1, further comprising:

determining, with the ECU, the optimal values $\theta$ of a model parameter vector $\theta$ using a representative of N samples of experimental data set taken on the healthy system;

estimating, with the ECU, the bias $h_0$ of the system based on at least of the optimal values θ of the model parameter vector, of the input vector x and of the temperature drop y=ΔT of the EGR cooler;

calculating, with the ECU, matrix E on experimental data relating to the healthy system:

$$E_{ij}=\epsilon_j(\theta_0,x_i,y_i^0)-h_{0i}$$

calculating, with the ECU, a covariance matrix $R_0$ of an healthy improved residual matrix:

$$R_0=\mathrm{cov}(E)$$

wherein model parameters $\theta_0$, the bias $h_0$ and the covariance matrix $R_0$ are calculated only during the calibration phase.

3. The method for the diagnosis of the efficiency of the EGR cooler in the diesel engine as in claim 1, wherein an estimation of the bias $h_0$ of the system follows:

$$h_0=E[\varepsilon(\theta_0,x,y^0)]=\frac{1}{K}\sum_{k=1}^{K}(\varepsilon(\theta_0,x_k,y_k^0)).$$

4. The method for the diagnosis of the efficiency of the EGR cooler in the diesel engine as in claim 1, wherein the model for determining the temperature drop in the EGR cooler obeys:

$$T_{in}-T_{out}=k_1\cdot T_{H_2O}\cdot(P_{exhaust}-P_{intake})^{k2}\cdot T_{exhaust}^{k3}\cdot N_{eng}^{k4}$$

where:

$T_{in}$=temperature at the inlet of the EGR cooler, $T_{out}$=temperature at the outlet of the EGR cooler, $T_{H2O}$=coolant temperature, $P_{exhaust}$ pressure at the outlet of the EGR cooler, $P_{intake}$=pressure at the inlet of the EGR cooler, $T_{exhaust}$=temperature at an exhaust of the EGR cooler, and $N_{eng}$=engine speed.

5. The method for the diagnosis of the efficiency of the EGR cooler in the diesel engine as in claim 4, wherein the parameter vector θ ($k_1$, $k_2$, $k_3$, $k_4$) is identified and validated from a set of steady state test bench measurements.

6. The method for the diagnosis of the EGR cooler in a Diesel engine as in claim 1, wherein a distribution of values of the diagnostic index S is Gaussian and the statistical $\chi_2$ (chi-square) distribution is used in order to define a diagnostic threshold index that univocally set the probability to find a EGR cooler fault.

* * * * *